United States Patent
Trombetta et al.

(10) Patent No.: US 11,660,544 B2
(45) Date of Patent: May 30, 2023

(54) STATISTICAL DRIVEN TOURNAMENTS

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/380,373

(22) Filed: Jul. 20, 2021

(65) Prior Publication Data

US 2021/0346809 A1 Nov. 11, 2021

Related U.S. Application Data (63) Continuation of application No. 15/908,722, filed on Feb. 28, 2018, now Pat. No. 11,065,548.

(51) Int. Cl.
*A63F 13/32* (2014.01)
*A63F 13/798* (2014.01)
(Continued)

(52) U.S. Cl.
CPC .......... *A63F 13/798* (2014.09); *A63F 13/211* (2014.09); *A63F 13/213* (2014.09);
(Continued)

(58) Field of Classification Search
CPC .... A63F 13/798; A63F 13/211; A63F 13/213; A63F 13/215; A63F 13/795; A63F 13/32; A63F 13/33
See application file for complete search history.

(56) References Cited

U.S. PATENT DOCUMENTS 6,546,421 B1    4/2003 Wynblatt et al.
8,702,520 B2    4/2014 Seelig et al.
(Continued)

FOREIGN PATENT DOCUMENTS

EP    3 058 996    8/2016
EP    3 758 814    1/2021
(Continued)

OTHER PUBLICATIONS

Application No. 19761465.4 Extended European Search Report dated Sep. 1, 2021.
(Continued)

*Primary Examiner* — Omkar A Deodhar
*Assistant Examiner* — Shauna-Kay Hall
(74) *Attorney, Agent, or Firm* — Polsinelli LLP (57) ABSTRACT

The subject disclosure relates to systems and methods for ranking video game players based on performance statistics recorded during game-play. In some aspects, a process of the subject technology can include operations for receiving a first set of game-play attributes including two or more game-play statistics for measuring a first player's performance relative to a first game and a second game, receiving a second set of game-play attributes including two or more game-play statistics for measuring a second player's performance relative to the first game and the second game, and automatically ranking the first player and the second player based on the first set of game-play attributes and the second set of game-play attributes. Systems and computer-readable media are also provided.

19 Claims, 4 Drawing Sheets

(51) Int. Cl.
  *A63F 13/795* (2014.01)
  *A63F 13/213* (2014.01)
  *A63F 13/211* (2014.01)
  *A63F 13/215* (2014.01)
  *A63F 13/33* (2014.01)

(52) U.S. Cl.
  CPC .......... *A63F 13/215* (2014.09); *A63F 13/795* (2014.09); *A63F 13/32* (2014.09); *A63F 13/33* (2014.09)

(56) References Cited

U.S. PATENT DOCUMENTS

| | | |
|---|---|---|
| 9,216,356 B2 | 12/2015 | Grier |
| 9,479,602 B1 | 10/2016 | Paradise et al. |
| 9,814,987 B1 | 11/2017 | Lawson |
| 11,065,548 B2 | 7/2021 | Trombetta |
| 11,241,630 B2 | 2/2022 | Trombetta |
| 11,426,654 B2 | 8/2022 | Trombetta |
| 11,439,918 B2 | 9/2022 | Trombetta |
| 11,439,919 B2 | 9/2022 | Trombetta |
| 11,452,943 B2 | 9/2022 | Trombetta |
| 2004/0257994 A1 | 12/2004 | Paskett et al. |
| 2005/0020359 A1 | 1/2005 | Ackely et al. |
| 2005/0026699 A1 | 2/2005 | Kinzer et al. |
| 2006/0287096 A1 | 12/2006 | O'Kelley et al. |
| 2007/0117617 A1 | 5/2007 | Spanton et al. |
| 2007/0149288 A1 | 6/2007 | Nickell et al. |
| 2007/0191102 A1 | 8/2007 | Coliz et al. |
| 2008/0119286 A1 | 5/2008 | Brunstetter et al. |
| 2009/0042646 A1 | 2/2009 | Sarkar et al. |
| 2009/0082110 A1 | 3/2009 | Relyea et al. |
| 2009/0144448 A1 | 6/2009 | Smith |
| 2011/0092282 A1 | 4/2011 | Gary |
| 2011/0250939 A1 | 10/2011 | Hobler |
| 2012/0142411 A1 | 6/2012 | Thompson et al. |
| 2013/0231189 A1 | 9/2013 | Beeler |
| 2013/0331192 A1 | 12/2013 | Betti et al. |
| 2014/0031121 A1 | 1/2014 | Kern et al. |
| 2014/0228112 A1 | 8/2014 | Laakkonen et al. |
| 2014/0274368 A1 | 9/2014 | Cotter |
| 2014/0331265 A1 | 11/2014 | Mozell et al. |
| 2015/0238859 A1 | 8/2015 | Fear |
| 2015/0348373 A1* | 12/2015 | Weingardt .......... G07F 17/3258 463/32 |
| 2016/0051895 A1* | 2/2016 | Hood .................. A63F 13/35 463/29 |
| 2016/0193530 A1 | 7/2016 | Parker et al. |
| 2016/0214012 A1 | 7/2016 | Nishikawa |
| 2016/0243450 A1 | 8/2016 | Cotter |
| 2017/0001122 A1 | 1/2017 | Leung et al. |
| 2017/0003784 A1 | 1/2017 | Garg et al. |
| 2017/0182426 A1 | 6/2017 | Loeb et al. |
| 2017/0209795 A1 | 7/2017 | Harvey et al. |
| 2017/0282075 A1 | 10/2017 | Michot et al. |
| 2017/0282082 A1 | 10/2017 | Hubbard |
| 2017/0374402 A1* | 12/2017 | Pogorelik .......... H04N 21/4756 |
| 2018/0001199 A1 | 1/2018 | Gary |
| 2019/0099675 A1 | 4/2019 | Khan et al. |
| 2019/0102941 A1 | 4/2019 | Khan et al. |
| 2019/0118098 A1 | 4/2019 | Payzer et al. |
| 2021/0178257 A1 | 6/2021 | Trombetta |
| 2021/0205711 A1 | 7/2021 | Thielbar |

FOREIGN PATENT DOCUMENTS

| | | |
|---|---|---|
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2001-170360 | 6/2001 |
| JP | 2007-036830 | 2/2007 |
| JP | 2011-512172 | 4/2011 |
| JP | 2011-224204 | 11/2011 |
| JP | 2012-176127 | 9/2012 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| WO | WO 2010/030313 | 3/2010 |
| WO | WO 2016/201333 | 12/2016 |
| WO | WO 2018/004812 | 1/2018 |

OTHER PUBLICATIONS

Application No. 19761341.7 Extended European Search Report dated Aug. 17, 2021.
Application No. 19761523.0 Extended European Search Report dated Aug. 12, 2021.
Application No. 202027037125 First Examination Report dated Aug. 5, 2021.
Application No. 19760493.7 Extended European Search Report dated Sep. 2, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
Application No. 19760732.8 Extended European Search Report dated Oct. 1, 2021.
Application No. 10-2019-7029332 Office Action dated Oct. 19, 2021.
Application No. 19760888.8 Extended European Search Report dated Oct. 27, 2021.
Application No. 19760016.6 Extended European Search Report dated Oct. 8, 2021.
Application No. 19759929.3 Extended European Search Report dated Oct. 25, 2021.
Application No. 19760240.2 Extended European Search Report dated Feb. 2, 2022.
Application No. 19760240.2 Partial Supplementary European Search Report dated Oct. 13, 2021.
Application No. 19760890.4 Extended European Search Report dated Nov. 10, 2021.
Application No. 202027037244 First Examination Report dated Dec. 15, 2021.
U.S. Appl. No. 17/014,149 Office Action dated Sep. 29, 2021.
U.S. Appl. No. 17/014,182 Office Action dated Sep. 29, 2021.
U.S. Appl. No. 17/000,841 Office Action dated Sep. 20, 2021.
U.S. Appl. No. 17/015,845 Office Action dated Oct. 6, 2021.
U.S. Appl. No. 17/060,458 Office Action dated Oct. 6, 2021.
U.S. Appl. No. 17/080,551 Office Action dated May 12, 2022.
U.S. Appl. No. 17/188,544 Office Action dated Jun. 27, 2022.
U.S. Appl. No. 17/080,580 Office Action dated May 26, 2022.
U.S. Appl. No. 15/448,356 Final Office Action dated Jul. 28, 2021.
PCT Application No. PCT/US22224943 International Search Report and Written Opinion dated Jul. 28, 2022.
U.S. Appl. No. 17/207,679 Office Action dated Jul. 22, 2022.
U.S. Appl. No. 17/362,416 Office Action dated Sep. 6, 2022.
Racing game video curation application "Motor Tube" starts delivering its service, 4Gamer.net [online], Nov. 17, 2016 [retrieved on: Nov. 25, 2022].
Support is announced for battle game video curation application "Kak-gei Tube", MSY [onlin], Jul. 14, 2016 [retrieved on: Nov. 25, 2022].
Application No. 2020-545251 Non-Final Notification of Reasons for Refusal dated Oct. 11, 2022.
Application No. 2020-545273 Non-Final Notification of Reasons for Refusal dated Oct. 18, 2022.

(56) References Cited

OTHER PUBLICATIONS

Application No. 2020-55313 Non-Final Notification of Reasons for Refusal dated Dec. 6, 2022.
Application No. 2020-545317 Non-Final Notification of Reasons for Refusal dated Nov. 15, 2022.
Application No. 2020-545263 Non-Final Notification of Reasons for Refusal dated Dec. 6, 2022.
Application No. 2020-545320 Notification of Reasons for Refusal dated Nov. 15, 2022.
Application No. 2020-545275 Non-Final Notification of Reasons for Refusal dated Oct. 18, 2022.
Application No. 2020-545245 Non-Final Notification of Reason(s) for Refusal dated Oct. 4, 2022.
Application No. 2020-545251 Final Notification of Reasons for Refusal dated Mar. 28, 2023.
Application No. 201880028575.0, First Office Action dated Feb. 20, 2023.

* cited by examiner

STATISTICAL DRIVEN TOURNAMENTS

CROSS-REFERENCE TO RELATED APPLICATION

The present application is a continuation and claims the priority benefit of U.S. patent application Ser. No. 15/908,722 filed Feb. 28, 2018, now U.S. Pat. No. 11,065,548, which is incorporated herein by reference in its entirety.

BACKGROUND

1. Technical Field

Aspects of the subject technology relate to the creation and management of online gaming leagues, and in particular, to an online platform for automatically managing player rankings in asynchronous online gaming competition.

2. Description of the Related Art

Like any popular competitive activity, such as football, card games and board games, online games have a large following of fans that appreciate competitive games and highly skilled players. As with other games, such fans also enjoy structured competition amongst peers of comparable skill level. For example, by encouraging a competitive atmosphere amongst peers, fantasy sports leagues and competitions have become a widespread activity. While fantasy leagues for a variety of sports are now widely available, comparable leagues for online games are not readily available for non-professional players.

SUMMARY OF THE CLAIMED INVENTION

Embodiments of the claimed invention include methods and systems for managing an online gaming league and in particular, for performing player rankings across multiple game titles and game-play statistics. Such systems may include a network interface that is configured to receive a first set of game-play attributes comprising two or more game-play statistics for measuring a first player's performance relative to a first game and a second game, and a second set of game-play attributes comprising two or more game-play statistics for measuring a second player's performance relative to the first game and the second game. In some aspects, the discloses systems may further include processors that execute instructions stored in non-transitory memory to automatically rank the first player and the second player based on the first set of game-play attributes and the second set of game-play attributes.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Competitive gaming, commonly referred to as electronic sports or "eSports," involve the play of video games in a competitive environment. Videogame competitions have existed for nearly as long as video games themselves. Early competitions were set up as tournament style matches between players focused on one particular game, often tied to a new product release. Eventually, competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), and Global StarCraft® League, provide opportunities for competition and to find information about competitive gaming. Until recently, participation in competitive gaming has demonstrated a gradual and steady pace in growth. However, competitive gaming is presently undergoing a rapid expansion in participation and interest.

Unlike fantasy gaming leagues, such as fantasy football, non-professional players of online games have limited ability to create and manage their own leagues in which players a similar skill level can compete. Additionally, online gamers lack access to a centralized platform that can be readily configured to perform player rankings, and that are based on player determined metrics and/or attributes across multiple game titles. Accordingly, it would be desirable to provide a gaming platform to flexibly permit the creation of leagues by both professional and non-professional players, as well as to manage the automatic scoring and ranking of players based on developer and/or player determined metrics (e.g., game-play statistics) that are selected for multiple different game titles.

The subject technology addresses the foregoing limitations by providing a gaming league platform that facilitates the creation and management of customized gaming leagues. In some aspects, the gaming league platform can be configured to receive various game-play attributes, for example, from a league organizer or player that specify various game characteristics and game-play statistics to be used for ranking competitive users/players. Specified game characteristics can include a game genre (e.g., fantasy), or a game format (e.g., first person shooter), etc. Game-play statistics can correspond with measurable statistical metrics pertaining to game play, such as a number of points scored, levels reached, or difficulty modes that have been unlocked. Game-play attributes, including game-play statistics and/or characteristics can be specified for a single game title, or for multiple titles. As such, league organizers or other competitive players can create custom tailored competitions in which player rankings are automatically performed based on player selected criteria across multiple game titles.

As also discussed in further detail below, game-performance attributes can also be used to specify conditions for the particular league in which the competition is conducted. For example, game performance attributes can be used to set a duration of the league's competition (i.e., a "season" length), a requisite skill level for inclusion in the league, and/or specific parameters for restricting participation to certain players, e.g., an access control list.

Figure 1:
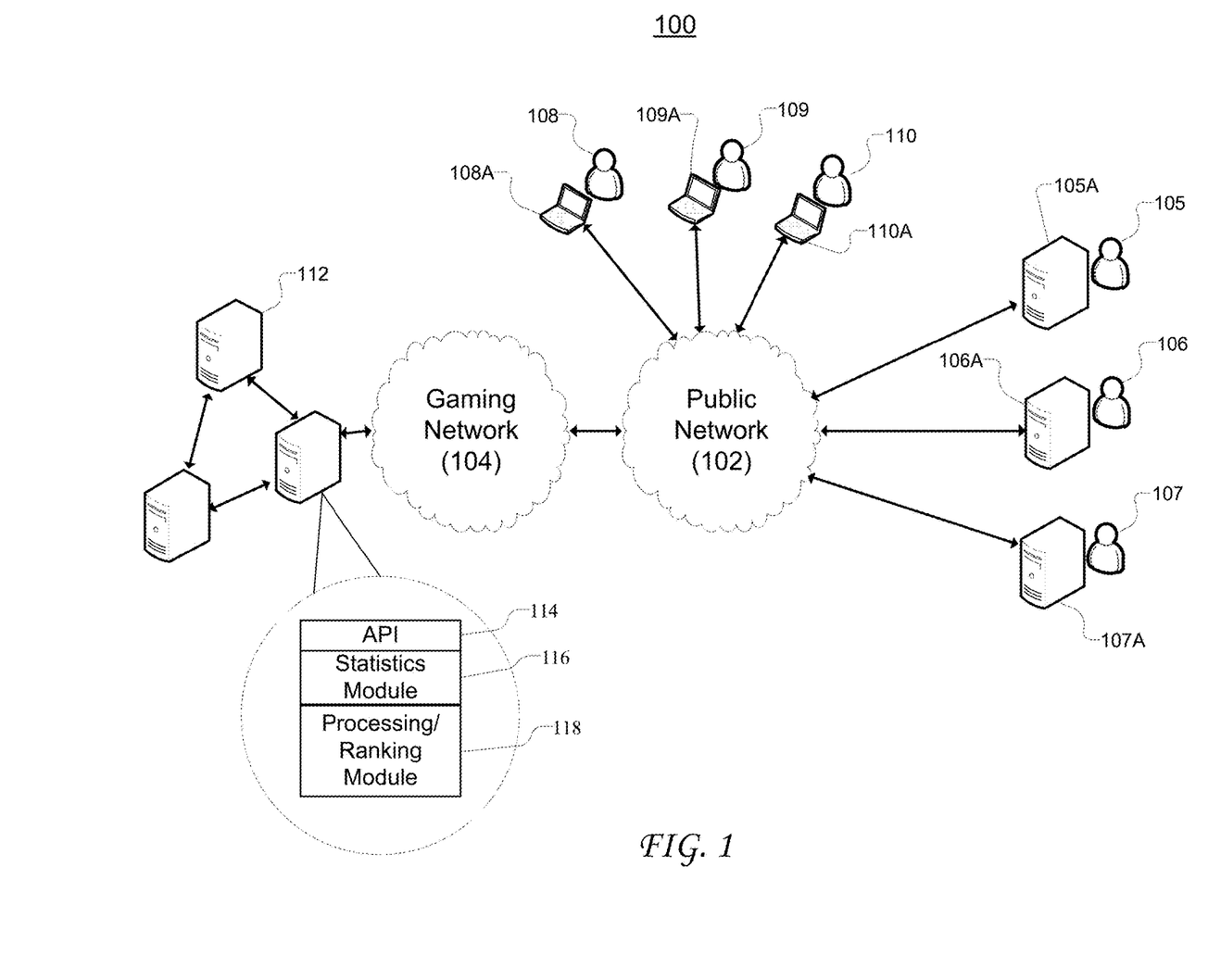
FIG. 1 illustrates an example of a network environment in which some aspects of the technology can be implemented.

FIG. 1 illustrates an example of network environment 100 in which some aspects of the technology can be implemented. Environment 100 includes public network 102, which can include one or more private networks, such as, a local area network (LAN), a wide area network (WAN), or a network of public/private networks, such as the Internet. Public network 102 is communicatively coupled to gaming network 104 that represents a network of computing resources configured for implementing gaming league management system 112 of the subject technology.

Public network 102, and gaming network 104 provide player and developer access to league management system 112. As illustrated, players 108, 109, and 110 are permitted access to league management system 112 using respective client devices (e.g., 108A, 109A, and 110A). Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are discussed in further detail below with respect to FIG. 4. Similarly, developers (e.g., 105, 106 and 107), are permitted access to league management system via respective their computing systems (e.g., 105A, 106A, and 107A).

It is understood that a greater (or fewer) number of players and/or developers can be engaged with environment 100, without departing from the scope of the technology.

In practice, league management system 112 is configured to create and support tournament style competitions between various players and for multiple different game titles, for example, to facilitate player competition across game genres, such as, real-time strategy (RTS) games, adventure games, puzzle games, and the like.

Because the metrics that are used to evaluate player performance for a particular game can vary widely between game title and type, in some aspects, game developers are encouraged to provide an indication of the specific game-performance attributes that should be used to evaluate player performance for the developer's game.

By way of example, developers 105, 106, and/or 107 can be developers of different game titles, each of which is associated with a different genre. To facilitate league competition for their games, each of the developers can submit game-performance attributes to the league, e.g., using respective computing systems 105A, 106A, and 107A. In a similar manner, the creation of gaming leagues and corresponding league parameters can be managed at the player level, for example, by one or more players 108, 109, and/or 110. That is, individual players or player collectives can provide specific game-performance attributes that they would like implemented to structure their own individualized league play.

Although game-performance attributes can include virtually any type of information that can be used in conjunction with the creation, execution, management, and/or promotion of a gaming league, in some aspects, game-performance attribute information can include game characteristics, including but not limited to one or more of: a "match type," "event information," and/or a player access list, etc. Game attributes information can also include game statistics, including but not limited to "high-level" player statistics such as: win/loss records, play time duration, levels achieved, points scored, and/or an ELO rating, etc. In some aspects, game statistics include "low-level" player statistics, including but not limited to: map-position information, map-path information, shots fired, time with rifle, time in kneel, time running, time to first fix, time to acquire a target, (e.g., "quick-draw" metrics), and/or measures of player/avatar health, etc.

The game-performance attributes, including game characteristics and game-play statistics can be received and recorded by league management system 112, for example, using an application programming interface (API), such as API 114. Subsequently, the game-performance attributes can be passed from API 114 to statistics module 116 for use in player analysis. In a similar manner, game-play statistics can be collected by API 114 and passed to statistics module 116. Depending on implementation, game-play statistics can be collected via active monitoring of an online game environment, or received from one or more external systems, for example, as part of a game performance data set that includes information describing individual player performance for one or more game titles and/or genre categories.

In some aspects, rankings can be automatically performed for multiple players based on player-specified game-attributes, including game characteristic and game-play statistic information. As discussed in further detail below with respect to FIG. 2, player provided game-attribute information can be used to compare and rank players across different game titles and genres, as well as for different statistical measures of player performance for a given game title.

In some aspects, rankings can be performed for a specified time period (e.g., the last 2 months of play), for a predetermined number of game plays (e.g., for 100 plays of a particular title), or for a "best-of" selection, e.g., by selecting the 3 best games played, or 5 best games out of 10, etc.

In other aspects, competition may endure for a predetermined time period, before rankings are performed. Once league competition has concluded, league management system 112 can use the game performance attributes, and game-play statistics to determine a ranking based on skill level for each player in a given league, e.g., using processing/ranking module 118. Determinations of skill level can vary depending upon the specified game performance attributes, and can vary between game titles, and/or game genres. By way of example, skill level for a given player can be based on one or more of: collected points, a number of wins/losses, total game time, achieve difficulty level, and/or a number of "kills," etc.

At the conclusion of league competition, designations of achievement can be provided based on the overall ranking of a player or group of players. For example, digital trophies or medals can be provided to the top-ranked player (or player team), and published on an associated player (or team) profile. By publishing player (or team) accomplishments, competition can be encouraged amongst users of the online gaming environment, either on a game-by-game basis, a league-by-league basis, or across various game genres.

In some aspects, players in a given league can be ranked into multiple categories or "tiers." By way of example, a "platinum" tier may be designated for the top 2% of players, a "gold" tier designated for the subsequent 20% of players, a "silver" tier designated for the next 28% of players, and a "bronze" tier designated for the last 32%, etc. Subsequent to the conclusion of league play, players may be either promoted (to a higher league tier), or demoted. By way of example, the top 10% of players in a tier may be moved up in tier ranking, e.g., from bronze to silver, and the bottom 10% in the tier may be moved down, e.g., from gold to silver tier.

The ranking of players within a given league also facilitates the ranking of various leagues into league hierarchies. For example, players categorized into the top tier of their respective league at the conclusion of a league competition may have the option of joining a higher league once competition resumes, i.e. in the subsequent "season." Similarly, low performing players may be demoted down the league hierarchy once competition resumes.

Figure 2:
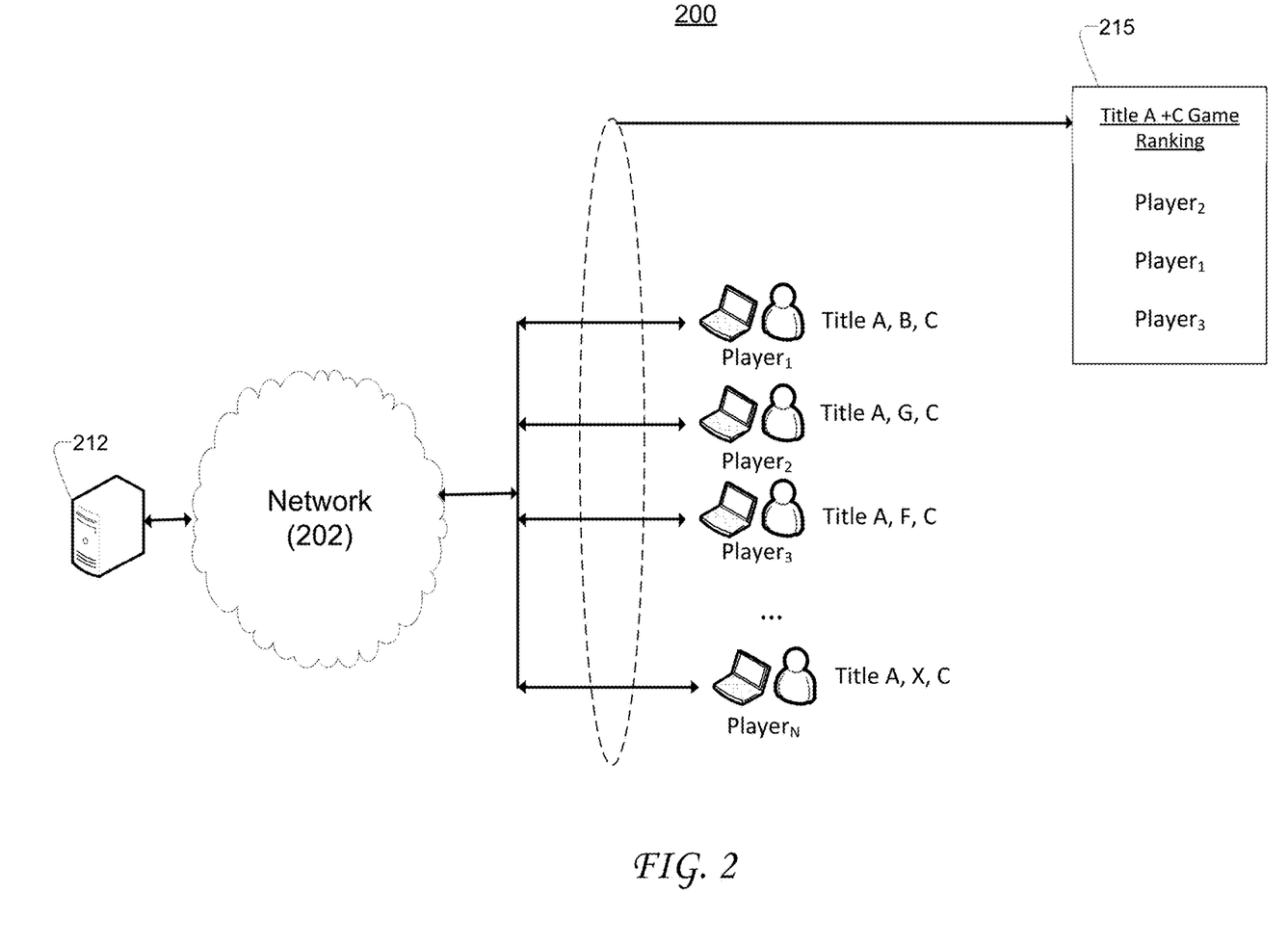
FIG. 2 conceptually illustrates the ranking of players across multiple game titles in an asynchronous competitive gaming environment.

FIG. 2 conceptually illustrates the ranking of players across multiple game titles in an asynchronous competitive game-play environment 200. Environment 200 includes ranking system 212 that is configured to receive game-play attribute information resulting from player engagement with various game titles, e.g., via network 202. In the example of FIG. 2, each of the players (e.g., Players$_{1-N}$) can be engaged with a different set of game titles. For example, Player$_1$ plays game titles A, B, and C, Player$_2$ plays titles A, G, C, and Player$_3$ plays titles A, F, C, etc.

In practice, player competition across one or more game titles can be asynchronous. That is, each player may play different game titles at a different time. However, user performance information with respect to each title (for each player) can be recorded, (e.g., by league management system 112, discussed above), and used to determine relative player rankings, e.g., using ranking system 212.

In some aspects, player rankings may be determined across multiple common game titles. As illustrated in FIG. 2, each of the players plays a slightly different mix of games, however, each player engages with titles A and C. As such, scoreboard 215 can include relative player rankings for common titles A and C.

Because rankings are determined based on game-play attributes collected from asynchronous user game-play, rankings for different user selected criteria can be determined on a post hoc basis. For example, Player$_1$ may initiate a competitive ranking with any number of other players by specifying any of one or more titles, one or more game characteristics, and/or one or more game-play statistics for which the ranking is to be performed. By offering the ability to collect asynchronous game-play attributes for each player, and for players to specify the metrics used for ranking competitive play, new player-defined leagues can be created for any number of player participants, and for any number of game titles.

However, it is understood that the ranking process of the disclosed technology is not limited to comparisons between different players for the same game. In some implementations, player rankings may be determined for similar metrics across different titles. By way of example, players may decide to see competitive rankings for kill rates in different first-person shooter games, or for lap-speeds in different racing games, etc.

Figure 3:
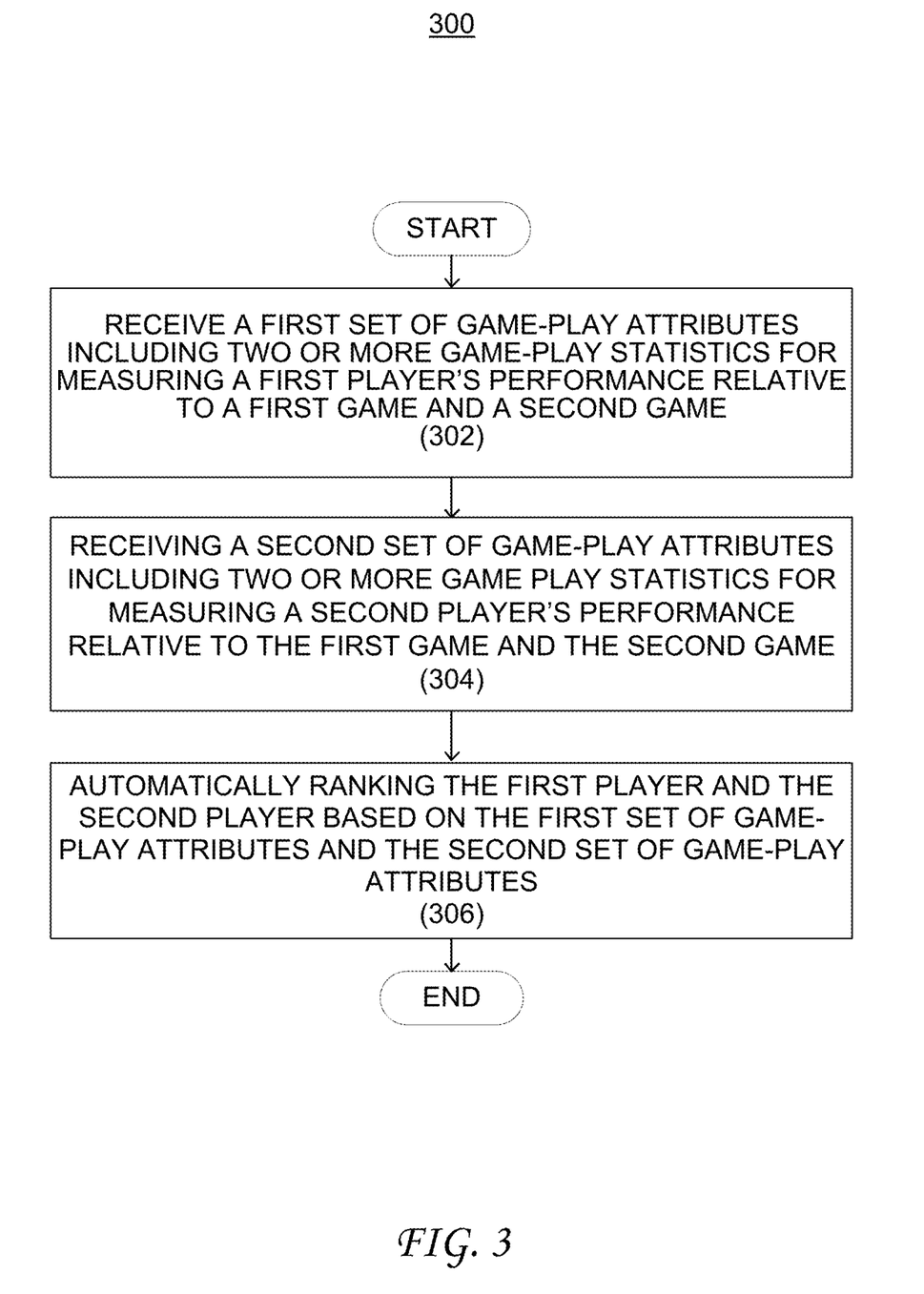
FIG. 3 illustrates steps of an example process for monitoring online game-play for a plurality of players, and raking users based on multi-title game play performance.

FIG. 3 illustrates steps of an example process 300 for monitoring online game-play for a plurality of players, and raking users based on multi-title game play performance. Process 300 begins with step 302, in which a first set of game-play attributes is received, e.g., by a ranking system, such as ranking system 212, discussed above. The game-play attributes can include two or more game-play statistics for measuring a first player's performance relative to a first game and a second game. That is, the first set of game-play attributes can include game characteristic information and/or game-play statistics for multiple titles that are played by the first player. As discussed above, the received game-play attributes can describe include information describing player interaction with virtually any number of game titles and for any game genre. Subsequently, in step 304, a second set of game-play attributes is received, including two or more game-play statistics for measuring a second player's performance relative to the first game and the second game.

In steps 302 and 304, game-play attributes for the first and second player can be received as a result of a monitoring process, for example, that involves recording/storing game-play statistics based on player performance in playing a video game for a specific game title. As discussed above, game-play statistics for a particular player can include information regarding any aspect of the player's performance or participation in an online game environment. For example, game-play statistics can include indications of a number of wins/losses incurred by the player, a difficulty level achieved by the player, a total time spent playing or engaged in the game environment, a number of points accumulated for various accomplishments/actions within the game environment, and/or an associated ELO score.

In step 306, an automatic ranking of the first player and the second player is performed based on the first set of game-play attributes and the second set of game-play attributes. The ranking can be based on a comparison of at least one of the game-play statistics corresponding with the first player's performance relative to the first game with at least one of the game-play statistics corresponding with the second player's performance relative to the first game, and a comparison of at least one of the game-play statistics corresponding with the first player's performance relative to the second game with at least one of the game-play statistics corresponding with the second player's performance relative to the second game As discussed above, the metrics used to perform the rankings can be determined by a player, league organizer, or virtually any party interested in creating a league for competitive online game-play. For example, league organizers can include individual players (e.g., players 108, 109, and 110) or game developers (e.g., developers 105, 106, and 107), as discussed above. However, it is understood that other entities may also provide game-play attributes necessary to organize league competition, without departing from the scope of the technology.

As discussed above, ranking can also be performed between various gaming leagues and/or cross entire game genres. For example, player ranking statistics can be automatically determined for an entire collection of game titles belonging to a similar genre, such as, "first person shooter" games, or "real-time strategy" games, etc.

Figure 4:
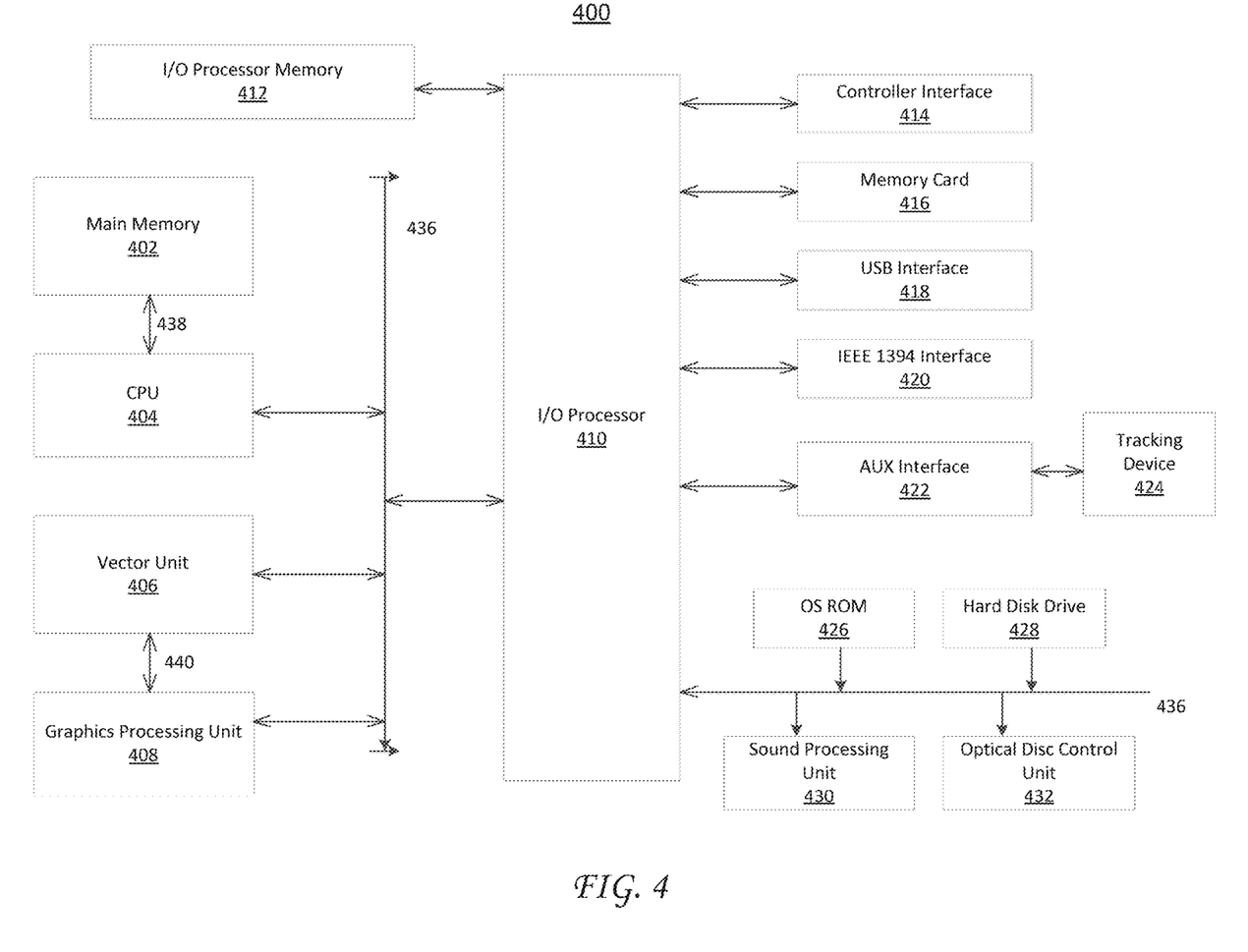
FIG. 4 illustrates an example of an electronic system with which some aspects of the subject technology can be implemented.

FIG. 4 is an exemplary user device 400. User device 400 (e.g., desktop, laptop, tablet, mobile device, console gaming system) is a device that the user can utilize to facilitate carrying out features of the present invention pertaining to the viewing of third party content.

The user device 400 may include various elements as illustrated in FIG. 4. It should be noted that the elements are exemplary and that other embodiments may incorporate more or less than the elements illustrated. With reference to FIG. 4, the user device 400 includes a main memory 402, a central processing unit (CPU) 404, at least one vector unit 406, a graphics processing unit 408, an input/output (I/O) processor 410, an I/O processor memory 412, a controller interface 414, a memory card 416, a Universal Serial Bus (USB) interface 418, and an IEEE 1394 interface 420, an auxiliary (AUX) interface 422 for connecting a tracking device 424, although other bus standards and interfaces may be utilized. The user device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

The tracking device 424 may be a camera, which includes eye-tracking capabilities. The camera may be integrated into or attached as a peripheral device to user device 400. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436. Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

The graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of the user device 400 provides instructions via the controller interface 414 to the CPU 404. For example, the user may instruct the CPU 404 to store certain information on the memory card 416 or instruct the user device 400 to perform some specified action.

Other devices may be connected to the user device 400 via the USB interface 418, the IEEE 1394 interface 420, and the AUX interface 422. Specifically, a tracking device 424, including a camera or a sensor may be connected to the user device 400 via the AUX interface 422, while a controller may be connected via the USB interface 418.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system for creating custom rankings, the system comprising:
    memory that stores information regarding a plurality of different game titles hosted by one or more gaming network devices;
    a communication interface that receives one or more selected gameplay attributes and a plurality of selected game titles, wherein the selected gameplay attributes and selected game titles are received over a communication network from a device associated with a league organizer; and
    a processor that executes instructions stored in memory, wherein the processor executes the instructions to:
        identify one or more gameplay statistics from each of the selected game titles that correspond to the selected gameplay attributes based on active monitoring of one or more game environments of the selected game titles,
        automatically assign a cross-title ranking to one or more players across the selected game titles in accordance with the selected gameplay attributes, wherein assigning the cross-title ranking to the players includes comparing the identified gameplay statistics from each of the selected game titles that measures a same type of attribute,
        create one or more custom gaming leagues for the ranked players, the gaming leagues including a plurality of tiers, and
        assign the players to the tiers of the gaming leagues based on the cross-title ranking.

2. The system of claim 1, wherein the gameplay attributes are used to set at least one of a season duration, a requisite skill level, or one or more parameters for restricting participating in the gaming leagues.

3. The system of claim 1, wherein the players are automatically ranked over a predetermined time period.

4. The system of claim 1, wherein the selected game titles are from different game genres that track different types of metrics, and wherein the gameplay statistics corresponding to the selected gameplay attributes are identified from the different types of metrics tracked by the different game genres.

5. The system of claim 1, wherein the processor further executes the instructions to implement active monitoring using one or more application programming interfaces (APIs) associated with each of the selected game titles hosted by one or more of the gaming network devices.

6. The system of claim 1, wherein the processor further executes the instructions to:
    update the rank of the players in the gaming league based on gameplay statistics of the players during league competition of the gaming league; and
    reassign the players to a different tier in the plurality of tiers based on the updated rank.

7. The system of claim 1, wherein the processor further executes the instructions to rank the one or more gaming leagues in a league hierarchy that includes a plurality of tiers.

8. The system of claim 7, wherein the league hierarchy is based on the ranking of the players in each of the gaming leagues.

9. The system of claim 1, wherein the processor further executes the instructions to publish information regarding one or more awards at an end of league gameplay, wherein the awards associated with one or more players or teams.

10. A method for creating custom rankings, the method comprising:
    storing information in memory regarding a plurality of different game titles hosted by one or more gaming network devices;
    receiving one or more selected gameplay attributes and a plurality of selected game titles via a communication interface, wherein the selected gameplay attributes and selected game titles are received over a communication network from a device associated with a league organizer; and
    executing instructions stored in memory, wherein the instructions are executed by a processor to:
        identify one or more gameplay statistics from each of the selected game titles that correspond to the selected game play attributes,
        automatically assign a cross-title ranking to one or more players across the selected game titles in accordance with the selected gameplay attributes, wherein assigning the cross-title ranking to the players includes comparing the identified gameplay statistics from each of the selected game titles that measures a same type of attribute,
        create one or more custom gaming leagues for the ranked players, the gaming leagues including a plurality of tiers, and
        assign the players to the tiers of the gaming leagues based on the cross-title ranking.

11. The method of claim 10, wherein the gameplay attributes are used to set a season duration, a requisite skill level, or one or more parameters for restricting participation in the gaming leagues.

12. The method of claim 10, wherein the players are automatically ranked over a predetermined time period.

13. The method of claim 10, wherein the selected game titles are from different game genres that track different types of metrics, and wherein the gameplay statistics corresponding to the selected gameplay attributes are identified from the different types of metrics tracked by the different game genres.

14. The method of claim 10, wherein the instructions are further executed to implement active monitoring using one or more application programming interfaces (APIs) associated with each of the selected game titles hosted by one or more of the gaming network devices.

15. The method of claim 10, wherein the instructions are further executed to:
   update the rank of the players in the gaming league based on gameplay statistics of the players during league competition of the gaming league; and
   reassign the players to a different tier in the plurality of tiers based on the updated rank.

16. The method of claim 10, wherein the instructions are further executed to rank the one or more gaming leagues in a league hierarchy that includes the plurality of tiers.

17. The method of claim 16, wherein the league hierarchy is based on the ranking of the players in each of the gaming leagues.

18. The method of claim 10, further comprising publishing information regarding one or more awards at an end of league gameplay, wherein the awards associated with one or more players or teams.

19. A non-transitory computer-readable storage medium, having embodied thereon a program executable by a processor to perform a method for creating custom rankings, the method comprising:

storing information in memory regarding a plurality of different game titles hosted by one or more gaming network devices;
receiving one or more selected gameplay attributes and a plurality of selected game titles via a communication interface, wherein the selected gameplay attributes and selected game titles are received over a communication network from a device associated with a league organizer;
identifying one or more gameplay statistics from each of the selected game titles that correspond to the selected gameplay attributes;
automatically assigning a cross-title ranking to one or more players across the selected game titles in accordance with the selected gameplay attributes, wherein assigning the cross-title ranking to the players includes comparing the identified gameplay statistics from each of the selected game titles that measures a same type of attribute,
creating one or more custom gaming leagues for the ranked players, the gaming leagues including a plurality of tiers, and
assigning the players to the tiers of the gaming leagues based on the cross-title ranking.

* * * * *